April 30, 1946.  A. C. CHESTER  2,399,323
OIL TANK
Filed Jan. 4, 1943  2 Sheets-Sheet 1
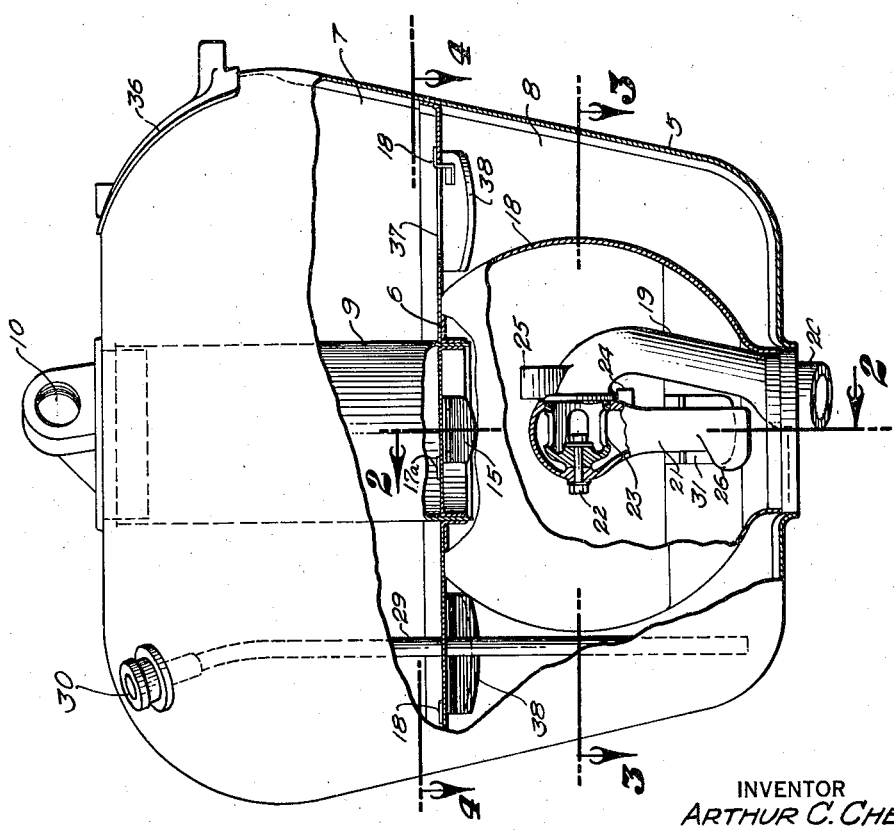
INVENTOR
ARTHUR C. CHESTER
BY Carlos G. Stratton
ATTORNEY April 30, 1946.　　A. C. CHESTER　　2,399,323
OIL TANK
Filed Jan. 4, 1943　　2 Sheets-Sheet 2

INVENTOR
ARTHUR C. CHESTER
BY Carlos G. Stratton
ATTORNEY

Patented Apr. 30, 1946

2,399,323

UNITED STATES PATENT OFFICE 2,399,323

OIL TANK

Arthur C. Chester, Los Angeles, Calif., assignor to North American Aviation, Inc., Inglewood, Calif.

Application January 4, 1943, Serial No. 471,279

3 Claims. (Cl. 137—21)

My invention relates to a tank, and more particularly to a liquid tank having means for the removal of liquid therefrom irrespective of whether the tank is upright, inverted, or in any intervening position.

An object of the present invention is to provide such a tank for use in aircraft, whereby liquid will flow therefrom while the aircraft is in inverted flight or during acrobatics.

Still another object is to provide an oil reservoir tank that will provide a continuous supply of oil during all flight positions.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is an elevational view of an embodiment of my invention, partly broken away.

Fig. 2 is a section taken on the line 2—2 of Fig. 1, illustrating the embodiment in a tipped position.

Figure 4:
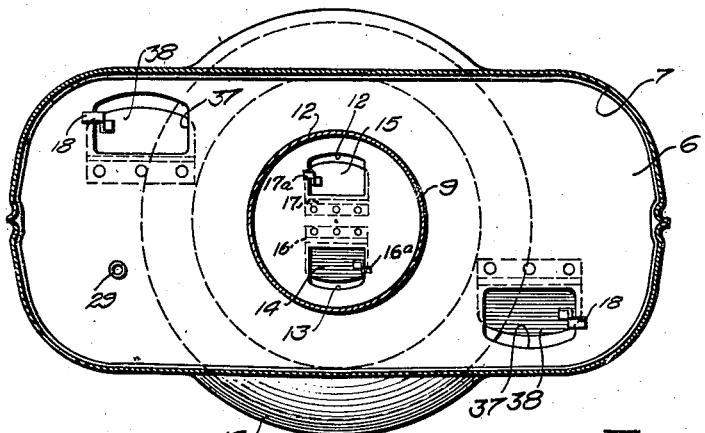
Fig. 4 is a section taken on line 4—4 of Fig. 1.

Referring more in detail to the drawings, the reference numeral 5 generally designates a tank housing which is divided by a normally horizontal partition 6, which separates the interior into an upper compartment 7 and a lower compartment 8. The upper compartment 7 has a pipe 9 which connects at its upper end with an inlet 10. The lower end of the pipe 9 has outlets 12 and 13. Check valves 14 and 15, pivoted at 16 and 17 respectively, are arranged to close the openings 12 and 13 when the tank is in an inverted position. Overhanging stops 16a and 17a on the valves restrict the opening movements of the valves to an acute angle. The stops overhang the edge of the openings 12 or 13, whereby the said edge restricts movement of the valve in one direction and restricts movement of the stop in the opposite direction.

The normally lower compartment 8 has a sump 18 into which fluid flows through the openings 12 and 13. The walls of the sump 18 are spaced from the wall of the housing 5 to provide the compartment 8.

An outlet pipe 19 is fixed within the sump 18 and connnects with a discharge pipe 20 for circulating the oil or other liquid to be used. An inlet conduit 21 is pivotally mounted upon the inner end of the pipe 19. The conduit 21 is pivotally mounted on a bolt 22. The inner end of the pipe 19 has inlets 23 which connect the conduit 21 with the pipe 19. A stop 24 on the conduit 21 engages a fixed stop 25 on the pipe 19 to prevent the conduit 21 from reaching an upward dead-center position.

Figure 3:
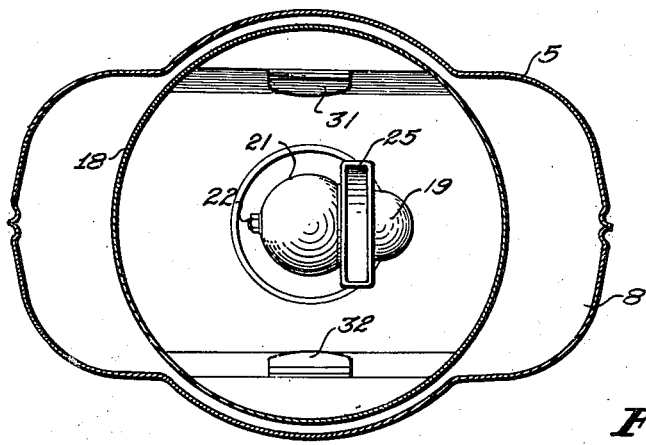
Fig. 3 is a section taken on line 3—3 of Fig. 1.
Figure 5:
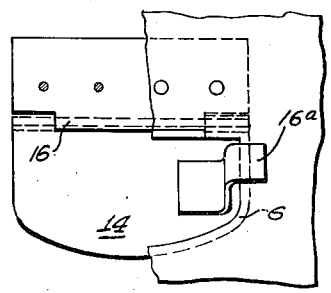
Fig. 5 is an enlarged plan view of a trap valve comprised in the invention, in a closed position.

The conduit 21 is weighted, as shown at 26, tending to cause the conduit 21 to depend irrespective of the position of the pipe 19. The pipe 19 and the other parts shown in Fig. 2 may swing through the arc defined by the broken arrows 27 and 28, but the weighted conduit 21 tends at all times to depend vertically by gravity. In Fig. 3, the stop 25 is shown as hollow. This hollow interior, however, does not connect with the interior of the pipe 19. The stop 25 is merely hollow to save weight.

A vent 29 passes transversely through the tank 5 from adjacent the normal floor of the compartment 8, as shown in Fig. 1. The vent has a nipple 30 that is connected, by means not shown, to the engine crankcase above the liquid level therein, thereby connecting the vent with the atmosphere. By this means, any small amount of oil that might enter the lower open end of the vent 29, during inversion or acrobatics, is returned to the crankcase and thereby returned to the system. Without such a vent arrangement, there is a possibility of a vacuum forming within tank 5 under certain conditions.

Flap or check valves 31 and 32 adjacent the lower portion of the sump 18, at opposite sides thereof, are normally closed during upright travel, due to the converging slope of the walls 33 and 34 of the sump. When, however, the aircraft and, therefore, the housing 5 are tipped, such as shown in Fig. 2, one of the flap valves 31 opens, tending to equalize the oil level inside the sump and in the lower compartment 8.

In the operation of my device, the conduit 21 depends by gravity, seeking the lowest point of the sump, whereby it may be constantly submerged. Oil is drawn up through the conduit 21, through the passages 23, through pipes 19 and 20. Irrespective of whether the tank 5 is upright, inverted, or in any intermediate position, this operation will continue. Of course, the conduit 21 will be tipped off the vertical when the tank 5 is directly inverted, but there is sufficient oil in the sump 18 to adequately supply the system during such inversion, thereby providing a continuous supply of oil during all flight positions.

Oil is returned to the tank through the inlet 10 and pipe 9. The pipe 9 in conjunction with the sump 18 provides a warm-up chamber. When the tank 5 is in the upright position, shown in Fig. 1, the trap valves 14 and 15 hang at an acute angle by means of the stops 18, thus permitting oil in the pipe 9 to flow into the sump 18. During inversion of the aircraft, the trap valves 14 and 15 close by gravity, thus trapping sufficient oil in the sump 18 to insure a constant supply for lubrication during inversion or acrobatics. As explained hereinbefore, the flap valves 31 and 32 permit equalization of the oil level inside the sump and in the normally lower compartment 6.

A normally closed door 36 covers an opening for supplying oil to the system. Fresh oil is introduced into the chamber 7 through such opening and is free to flow through openings 37 into the lower compartment 8 around the sump 18. During inversion, the valves 38 closing the openings 37 are closed by gravity, thus preventing oil in the compartment 8 from retrograding back to the compartment 7.

From the foregoing it is to be understood that the supply of oil introduced through the door 36 constitutes a reserve supply for possible use, if needed, when the tank is inverted. Normally the supply of oil to the sump 18 is through the inlet pipe 9, and this supply suffices to keep the sump 18 filled. When, however, the apparatus is inverted and the supply of oil through inlet pipe 9 ceases, the oil within sump 18 is prevented from back flow by the closing of valves 14 and 15. At the same time oil within the lower compartment 8 of the tank is held against back flow into the upper compartment 7 by the closing of valves 38 so that this oil stands as a reserve supply for the sump 18 during any and all periods where its normal supply through the inlet pipe 9 ceases to be sufficient to keep up with the demands of the motors or other equipment drawing from the sump. In any such instance, therefore, oil will transfer, through one or both of the valves 31 and 32 as it is needed in the sump.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. In a tank adapted to supply liquid in an upright or tipped position, an outlet pipe fixed with respect to the tank, a swinging conduit depending by gravity within the tank and connecting with the outlet pipe in the different swinging positions of the conduit, the conduit having an open mouth at its outer, swinging end, the tank having an interiorly curved wall generally parallel with and in proximity to the arc described by the open mouth of the swinging conduit, the tank having a liquid reservoir surrounding the chamber housing the swinging conduit, and oppositely disposed check valves arranged for the liquid within said chamber to tend to maintain the valves closed when the chamber is full, and the valves being arranged for one or the other to open into the chamber when the tank is tipped one way or the other to permit replenishment of the liquid in the chamber from the reservoir.

2. In a tank adapted to supply liquid in an upright or inverted position of the tank, an outlet pipe fixed with respect to the tank, a swinging conduit depending by gravity within the tank and connecting with the outlet pipe in the different swinging positions of the conduit, the tank having a sump housing the swinging conduit and having a liquid reservoir surrounding the sump and connected therewith, a fluid inlet supply chamber to normally supply liquid to the sump, a check valve arranged to permit liquid to pass from the supply chamber into the sump during upright position of the tank and arranged to prevent retrograde flow of the liquid from the sump back to the supply chamber when the tank is in an inverted position, and a check valve controlling communication between the sump and the reservoir and arranged for opening into the sump when the level of liquid falls in the sump, to thus replenish the sump from the reservoir upon failure of normal supply to the sump through its said inlet supply chamber.

3. In a tank adapted to supply liquid in an upright or inverted position of the tank, an outlet pipe fixed with respect to the tank, a swinging conduit depending by gravity within the tank and connecting with the outlet pipe in the different swinging positions of the conduit, the tank having a sump housing the swinging conduit and having a lower liquid reservoir surrounding and connected with the sump, a fluid inlet supply chamber superposed upon the sump to normally supply liquid thereto, the tank having an upper liquid reservoir surrounding the supply chamber and a lower liquid reservoir, a check valve arranged to permit liquid to pass from the supply chamber into the sump during upright position of the tank and arranged to prevent retrograde flow of the liquid from the sump back to the supply chamber when the tank is in an inverted position, a check valve arranged for opening into the sump when the level of liquid falls in the sump, to thus replenish the sump from the lower reservoir upon failure of normal supply to the sump through its said supply chamber, and a check valve arranged to prevent retrograde flow of liquid from the normally lower liquid reservoir into the normally upper liquid reservoir when the tank is in an inverted position but permitting the flow of liquid from the upper liquid reservoir to the lower liquid reservoir when the tank is in an upright position.

ARTHUR C. CHESTER.